United States Patent [19]
Lee et al.

[11] Patent Number: 4,571,588
[45] Date of Patent: Feb. 18, 1986

[54] SCALING CIRCUIT FOR REMOTE MEASUREMENT SYSTEM

[75] Inventors: Jenson K. S. Lee, Allston; Mahasukh Vora, Beverly, both of Mass.

[73] Assignee: Varian Associates, Inc., Palo Alto, Calif.

[21] Appl. No.: 497,291

[22] Filed: May 23, 1983

[51] Int. Cl.⁴ .............................................. G08C 15/08
[52] U.S. Cl. ............................... 340/870.13; 340/715; 324/115
[58] Field of Search .................. 340/715, 753, 286 M, 340/870.13, 870.27, 870.12, 870.11; 324/115, 116, 140 R

[56] References Cited

U.S. PATENT DOCUMENTS 3,742,354  6/1973  Sugiyama ........................... 324/115
4,062,005 12/1977  Freed et al. ..................... 340/870.12
4,114,094  9/1978  Cook et al. ........................ 324/115
4,115,733  9/1978  Silberberg .......................... 324/115
4,163,216  7/1979  Arpino ........................... 340/870.13
4,236,144 11/1980  Sunagawa ....................... 340/870.11
4,287,503  9/1981  Sumida ................................ 340/715

Primary Examiner—Gerald L. Brigance
Assistant Examiner—Jeffery A. Brier
Attorney, Agent, or Firm—Stanley Z. Cole; William R. McClellan

[57] ABSTRACT

Apparatus for displaying a plurality of remotely measured parameters. The data words representing the parameters have different scale factors and include a parameter identifier and a parameter value. The apparatus includes a decoder for determining from the parameter identifier the scale factor associated with a data word and a scaling circuit for scaling the parameter value. The scaling circuit can include binary dividers, one of which is selected by the decoder output. The scaled parameter value addresses a ROM which provides BCD digits for energizing a display unit associated with the parameter.

10 Claims, 4 Drawing Figures

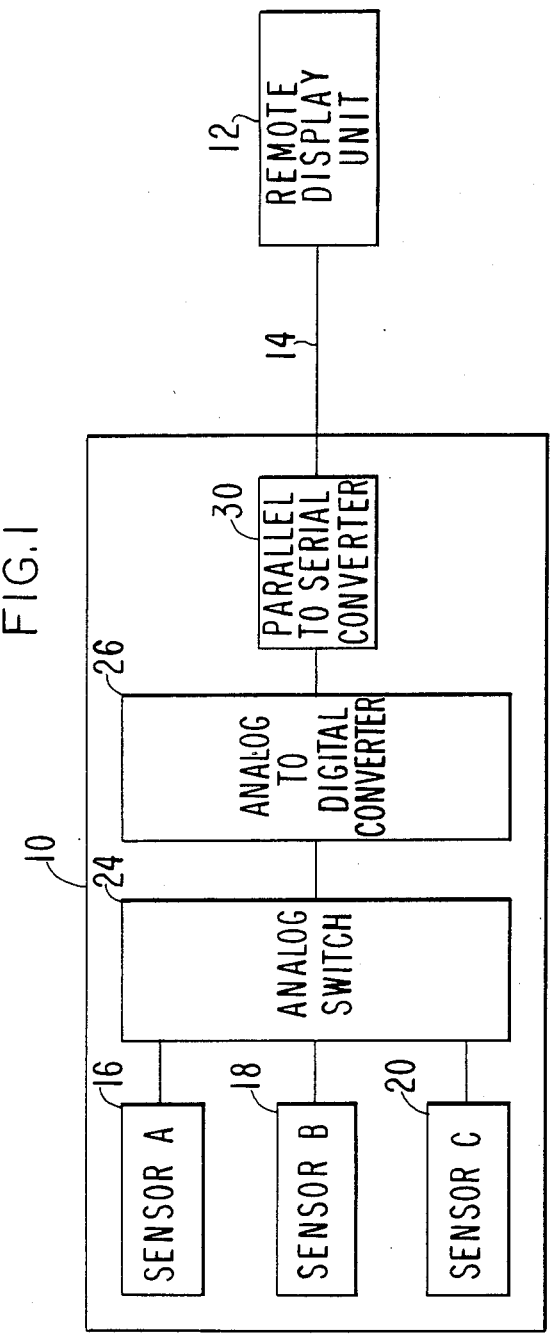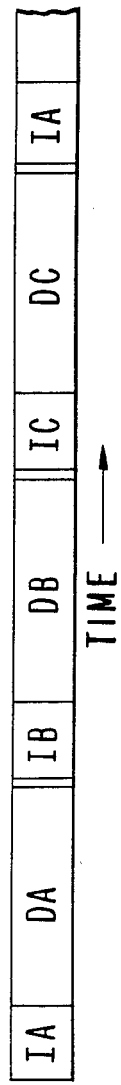

SCALING CIRCUIT FOR REMOTE MEASUREMENT SYSTEM

BACKGROUND OF THE INVENTION

This invention relates to systems for measurement and display of parameters and, more particularly, to apparatus for scaling and display of multiple parameter data from remote locations when the parameters have different ranges of values.

It is frequently necessary to monitor system or process parameters by displaying the parameter values at a location remote from the system or process. For example, in the fabrication of semiconductor devices, the processing equipment is typically located in a clean room, while the operator display and control can be located outside the clean room. Voltages, currents, vacuum levels, etc. are measured and transmitted to the remote display unit. Remote display units are utilized in numerous other applications. When data is transmitted over moderate or long distances, serial data transmission is almost always used to minimize the number of data transmission paths. In a typical system, the values of the measured parameters are converted to digital form and time multiplexed onto a serial data link for transmission to the remote display unit. The serial data link can be a pair of conductors, a telephone line or an optical fiber.

In general, the measured parameters have different ranges of values. For example, one parameter may be a voltage having a range from 0 to 4,000 volts, while while a second parameter may be a current having a range of values from 0 to 100 amps. The display system must be able to accurately measure and display the various parameters with a minimum of complexity.

Typically, the analog parameter values are converted to digital form by an analog-to-digital (A/D) converter before transmission over the serial line. In order to maintain maximum measurement accuracy, the full input range of the analog-to-digital converter must be utilized for each parameter. Therefore, different scale factors are associated with the parameter data for each parameter transmitted to the remote display unit.

Microprocessors can be used to properly scale the data received by the remote display unit and provide scaled display data. However, for low to moderate numbers of parameter measurements, the use of a microprocessor can be more complex than necessary.

It is an object of the present invention to provide a novel system for remote display of multiple measured parameters.

It is another object of the present invention to provide apparatus for scaling a data word representing one of a plurality of measured parameters depending on the range of values of the parameter.

It is yet another object of the present invention to provide apparatus for the display of measured parameters which apparatus is easily adaptable to display of parameters having different ranges of values.

SUMMARY OF THE INVENTION

According to the present invention, these and other objects and advantages are achieved, in a measurement and display system, by apparatus for converting a data word representing one of a plurality of measured parameters and including a parameter identifier and parameter data, to output data adapted for energizing a display. The apparatus comprises means responsive to the parameter identifier for determining a prescribed scale factor associated with the parameter, means for multiplying or dividing the parameter data by the prescribed scale factor to provide scaled parameter data, and data storage means operative to provide the output data in response to the scaled parameter data. The data word is typically received on a serial link from a remote location. The output data energizes one of a plurality of parameter displays.

BRIEF DESCRIPTION OF THE DRAWINGS

For a better understanding of the present invention, together with other objects, advantages and capabilities thereof, reference may be had to the accompanying drawings which are incorporated herein by reference and in which:

FIG. 1 is a block diagram of a remote measurement and display system;

FIG. 2 illustrates the content of the data transmitted to the remote display unit as a function of time;

DETAILED DESCRIPTION OF THE INVENTION

Figure 3:
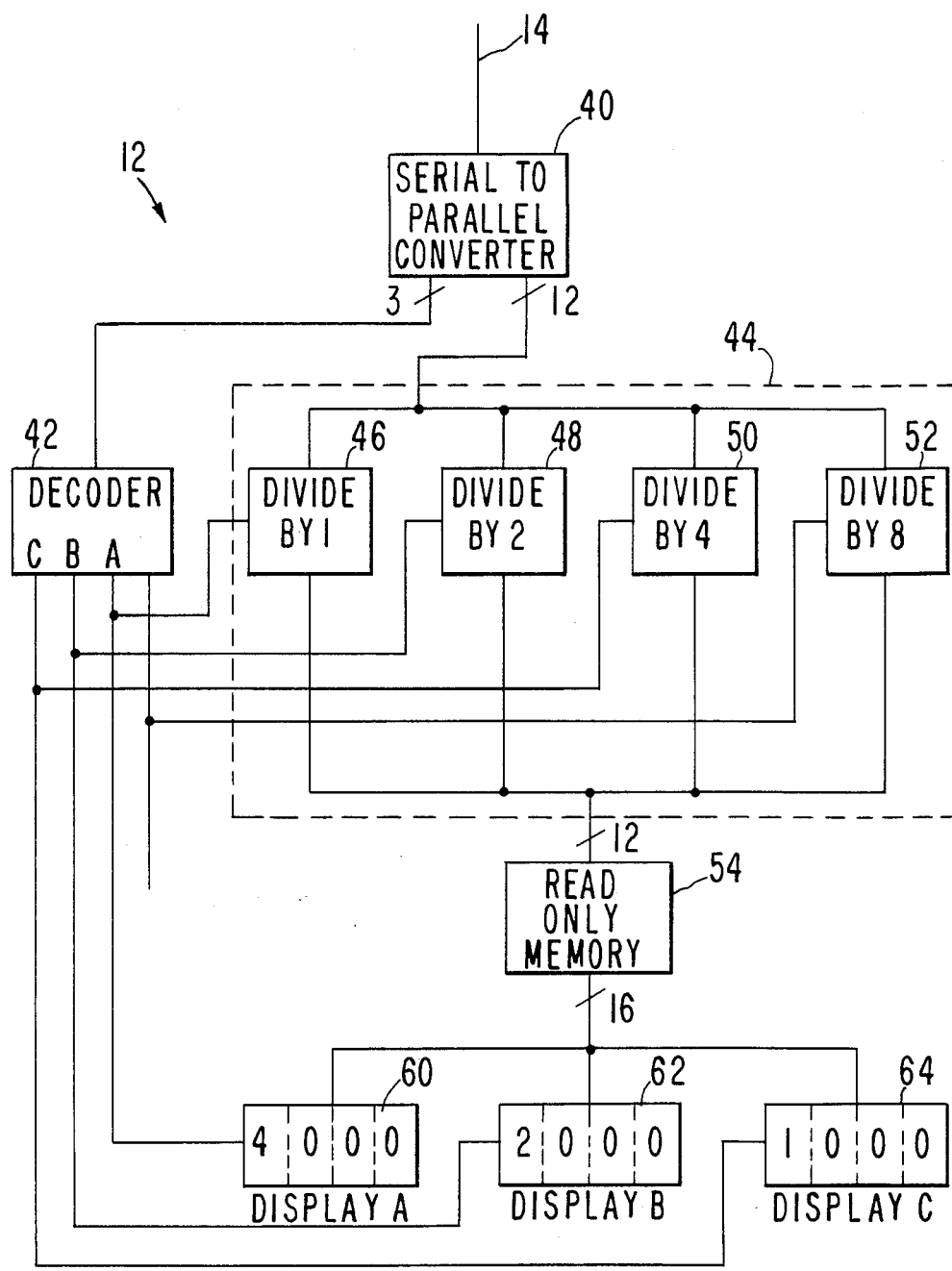
FIG. 3 is a block diagram of data conversion apparatus in accordance with the present invention.

A system incorporating remote measurement and display is illustrated in block diagram form in FIG. 1. A main system 10 at a first location and a remote display unit 12 at a second location are coupled together by a serial data link 14. A number of parameters of interest, such as voltages, currents, vacuum levels, etc. are sensed by sensors 16, 18, 20 which convert the measured parameters of interest to electrical signals. The outputs of the sensors 16, 18, 20 are selected sequentially by an analog switch 24 and are coupled one at a time to an analog-to-digital (A/D) converter 26. The data outputs of the A/D converter 26 are transferred to a parallel-to-serial converter 30. The parallel-to-serial converter 30 transmits serial data over the serial data link 14 to the remote display unit 12. A line driver (not shown) can be used to provide the necessary voltage and current to drive the data link 14. The parallel-to-serial converter 30 can be a shift register or a universal asynchronous receiver transmitter (UART). The serial data link 14 can include one or a few data lines and can utilize optical couplers to electrically isolate the main system 10 and the remote display unit 12. The stream of data can be self-clocking as in the case of the UART or can include a separate clock line for synchronization. It will be understood that FIG. 1 shows only the parts of the main system 10 which are related to the present invention.

In general, the parameters being measured in the main system 10 have different ranges of values. For example, one parameter may be a voltage in the range from 0 to 4,000 volts while a second parameter may be a current in the range from 0 to 200 amps. For maximum measurement accuracy, the range of output voltages from the sensors 16, 18, 20 should be equal to the input voltage range of the A/D converter 26. The sensors 16, 18, 20 can include amplifiers or voltage dividers to insure that the full range of the A/D converter is utilized. With this arrangement, maximum measurement accuracy is achieved; but each of the outputs of the A/D converter 26 has a different scale factor for each parameter.

A typical data format for transmission of data over the serial data link 14 is shown in FIG. 2. A data word for each of the parameters A, B, C, etc. is transmitted in serial, time-multiplexed format. The data word corresponding to each parameter includes a parameter identifier (IA, IB, IC, etc.) which identifies a particular parameter. The data word also includes parameter data (DA, DB, DC, etc.) which represents the value of the particular parameter. In one example, the parameter identifier is 3 bits and the parameter data is 12 bits. Up to 8 different parameters can be transmitted, and 4,096 parameter values can be transmitted.

Referring now to FIG. 3, there is shown a block diagram of the remote display unit 12. The serial data from the main system 10 is received on the serial data link 14 and is converted to parallel form by a serial-to-parallel converter 40. A line receiver (not shown) can be utilized to convert the received signal to logic compatible levels. The converter 40 can be a shift register, such as a type 74164, when a separate clock line is used to synchronize the data received from the main system 10. Alternatively, an asynchronous data transmission arrangement can be used. The converter 40 receives a data word corresponding to one of the measured parameters in the main system 10. The data word includes a parameter identifier and parameter data, as shown in FIG. 2 and described above. The parameter identifier is coupled to a decoder 42, which can be a 3 to 8 line decoder such as a 74S138. The parameter data from the converter 40 is coupled to a scaling circuit 44 which multiplies or divides the parameter data by a predetermined scale factor. In the embodiment of FIG. 3, the scaling circuit 44 includes a divide-by-one circuit 46, a divide-by-two circuit 48, a divide-by-four circuit 50, and a divide-by-eight circuit 52. For each data word received, one of the circuits 46, 48, 50, 52 is activated by an output of the decoder 42. For example, when the data word in the converter 40 represents the parameter B, the decoder 42 output B energizes the divide-by-two circuit 48. A binary division by two is performed on the parameter data, as described hereinafter. The outputs of the circuits 46, 48, 50, 52 are coupled in parallel to the address inputs of a read-only-memory (ROM) 54. In the present example, the ROM 54 includes 4096 addresses, each of which contains 4 BCD digits. For example, the ROM can store BCD digits from 0000 to 4,000. A suitable ROM is a type 2732A which is erasable and programmable. The outputs of the ROM 54 are coupled in parallel to displays 60, 62, 64, each of which can be a four-digit light emitting diode display with associated segment drivers. For each data word received by the converter 40, one of the displays 60, 62, 64 is enabled by an output of the decoder 42. Each display corresponds to one of the parameters being measured in the main system 10.

Figure 4:
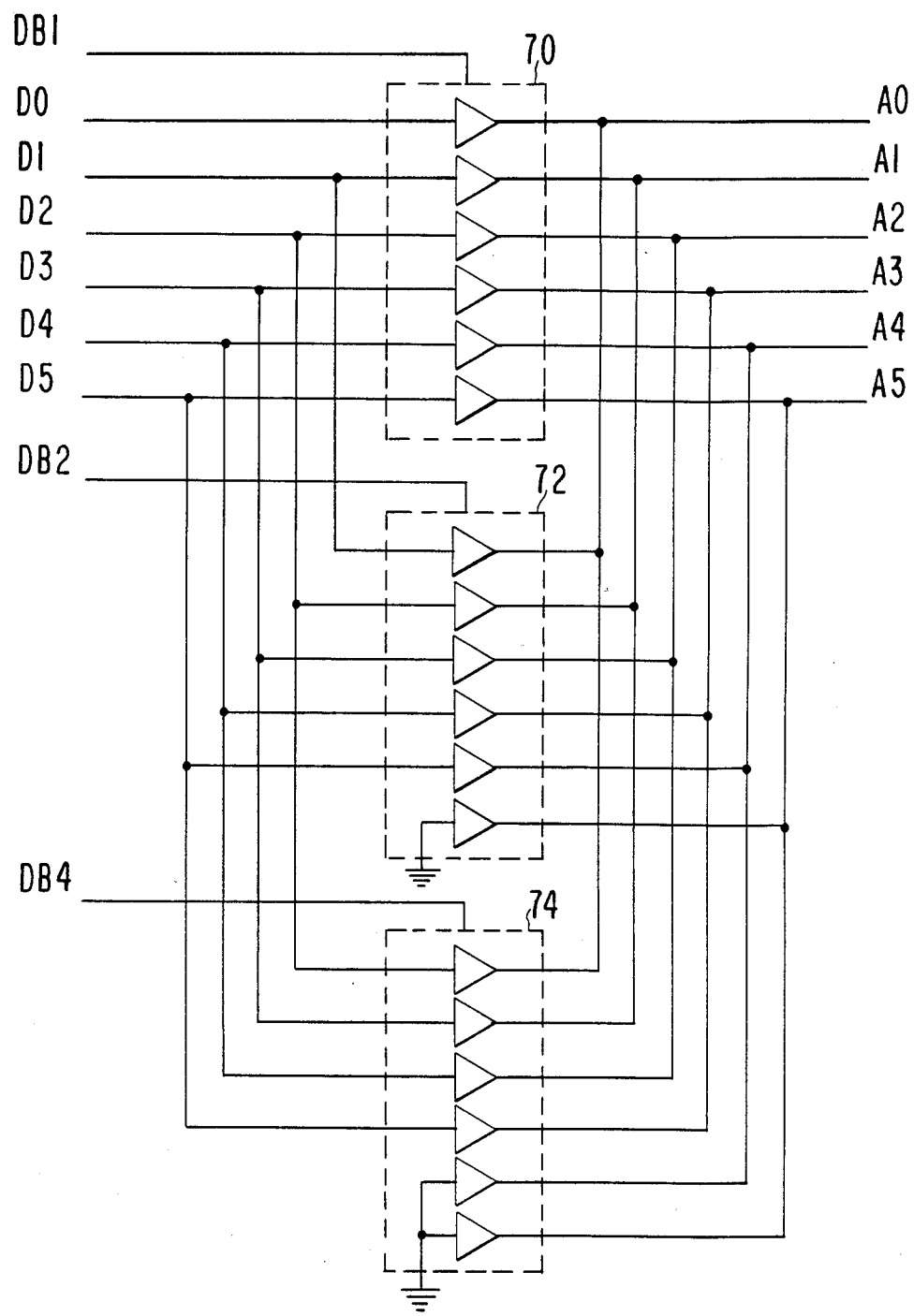
FIG. 4 is a schematic diagram of a preferred embodiment of a scaling circuit which can be utilized in the apparatus of FIG. 3.

The configuration of the scaling circuit 44 is shown in more detail in FIG. 4. A divide-by-one circuit 70, a divide-by-two circuit 72, and a divide-by-four circuit 74 are shown. For simplicity, a six bit circuit is shown. Each of the circuits 70, 72, 74 comprises a set of 6 tri-state buffers, the outputs of which can be a logic high, a logic low or a high impedance state. A suitable tri-state buffer is a type 74367. The circuits 70, 72, 74 receive data inputs D0–D5 with D5 being the most significant bit. When division by one is required, the circuit 70 is enabled by an input DB1; and the circuits 72, 74 are placed in the high impedance output state. In this case, the data base passes through the circuit 70 to the outputs A0–A5 and is not altered. For division by two, the circuit 72 is enabled by an input DB2, and circuits 70, 74 are placed in the high impedance output state. Data bits D0–D5 are coupled to the circuit 72 so as to shift the data one bit to the right, which corresponds to binary division by two. Thus, the outputs A0–A5 represent input data D0–D5 divided by two. When division by four is required, the circuit 74 is enabled by an input DB4, and circuits 70, 72 are placed in the high impedance output state. The data bits D0–D5 are coupled to the circuit 74 so as to shift the data two bits to the right, which corresponds to binary division by four. Thus, the outputs A0–A5 represent the data D0–D5 divided by four.

In operation, the apparatus of FIG. 3 receives data words in sequence representing measured parameters from the main system 10. For each data word, the parameter identifier is decoded by the decoder 42. The parameter data is scaled by the scaling circuit 44, in accordance with a predetermined scale factor which is associated with the particular parameter. The proper scale factor is determined by selective coupling of the outputs of the decoder 42 to the divider circuits 46, 48, 50, 52. The scaled parameter data from the scaling circuit 44 addresses a particular set of locations in the ROM 54, and the stored BCD numbers appear at the output of the ROM 54. One of the displays 60, 62, 64 is enabled by the decoder 42 in accordance with the parameter identifier and the BCD number from the ROM 54 is displayed. The scaling and display of several parameters is illustrated in Table I.

TABLE I

| Parameter | A | B | C | X |
|---|---|---|---|---|
| Parameter Range (volts, amps, etc.) | 0–4000 | 0–2000 | 0–10.00 | 0–200 |
| Parameter Data (binary) | 0–4095 | 0–4095 | 0–4095 | 0–4095 |
| Scale Factor | 1 | 2 | 4 | 2 |
| Scaled Parameter Data (binary) | 0–4095 | 0–2047 | 0–1023 | 0–2047 |
| Output Data (BCD) | 0–4000 | 0–2000 | 0–10.00 | 0–200.0 |

Parameters A, B and C are displayed on displays 60, 62, 64, respectively. Parameter X is shown for illustration only. As noted hereinabove, the full range of the A/D converter in the main system 10 is utilized for each parameter to insure full scale accuracy. Thus, the parameter data has the same range of binary values (0–4095 in the present example) for each parameter. The factor by which the parameter data is scaled depends on the parameter range. In the present example, the ROM 54 stores BCD numbers in the range from 0 to 4,000. When the measured parameter has a maximum value of 1,000, only the first 1,000 locations in the ROM are utilized; and the parameter data is divided by four. It will be understood that the decimal point in the parameter value is predetermined.

A preferred embodiment of the present invention is shown in FIGS. 1–4 and described hereinabove. It will be understood that any number of parameters can be measured and displayed by increasing the number of parameter identifier bits and the number of displays. The measurement accuracy can be increased by increasing the number of parameter data bits. Furthermore, additional division circuits can be added to the scaling circuit 44 for additional scale factors. Also, the parameter data can be multiplied by a predetermined scale factor. The size of the ROM 54 depends on the number of values to be displayed and the required accuracy, and can be sized accordingly. The apparatus of the present invention is easily programmable to accomodate different or additional parameters. The connections from the decoder to the scaling circuit are changed to reflect the scale factor of different or additional parameters. The overall range of displayed values can be altered by replacing the ROM. The present invention provides the capability to display parameters having different ranges with only one set of display values stored in the ROM.

While there has been shown and described what is at present considered the preferred embodiments of the invention, it will be obvious to those skilled in the art that various changes and modifications may be made therein without departing from the scope of the invention as defined by the appended claims.

We claim:

1. Apparatus for measurement and display of parameter values comprising:
    means for sensing a plurality of different parameters and generating a digital parameter data word for each measured parameter value, each parameter data word including a parameter identifier and parameter data;
    means responsive to said parameter identifier for determining a scale factor associated with said parameter;
    means for multiplying or dividing said parameter data by said scale factor to provide scaled parameter data;
    data storage means for providing display data in response to said scaled parameter data; and
    display means responsive to said display data for displaying the measured parameter values.

2. The apparatus as defined in claim 1 wherein said data storage means includes a read-only-memory which is addressed by said scaled parameter data.

3. The apparatus as defined in claim 2 wherein said means for determining said scale factor includes decoder means.

4. The apparatus as defined in claim 3 wherein said means for multiplying or dividing includes a plurality of binary dividers, which are enabled for operation one at a time by said decoder means.

5. Apparatus for displaying the values of a plurality of measured parameters comprising:
    register means for temporary storage of a data word representing one of said parameters, said data word including a parameter identifier and parameter data;
    decoder means responsive to said parameter identifier for determining a scale factor associated with said data word;
    binary divider means for dividing said parameter data by said scale factor to provide scaled parameter data;
    display means for display of said measured parameters;
    data storage means for providing parameter values to said display means in response to said scaled parameter data,
    whereby parameters having different ranges of values can be displayed and said data storage means is required to store only one set of parameter values.

6. The apparatus as defined in claim 5 wherein said means for temporary storage includes means for converting said data word from serial data received from a remote location to parallel data.

7. The apparatus as defined in claim 6 wherein said means for dividing includes a plurality of binary dividers, which are enabled for operation one at a time by said decoder means.

8. The apparatus as defined in claim 7 wherein said data storage means includes a read-only-memory which is addressed by said scaled parameter data.

9. The apparatus as defined in claim 5 wherein said display means includes a plurality of display units which are enabled one at a time by said decoder means in accordance with said parameter identifier for display of each parameter value.

10. A method for remotely displaying a plurality of measured parameter values comprising the steps of:
    converting each measured parameter value to a digital parameter data word including a parameter identifier and parameter data;
    transmitting each digital parmeter data word to a desired remote location;
    receiving each digital parameter data word at said remote location;
    identifying each parameter type received from said parameter identifier;
    scaling the parameter data for each parameter value in accordance with the identified parameter type by multiplying or dividing said parameter data by the appropriate scale factor associated with said parameter type so as to provide scaled parameter data;
    accessing stored display data with said scaled parameter data for each parameter value; and
    providing said stored display data corresponding to each parameter value to a display unit.

* * * * *